(12) United States Patent
Kruglick

(10) Patent No.: US 9,189,271 B2
(45) Date of Patent: Nov. 17, 2015

(54) OPERATION TRANSFER FROM AN ORIGIN VIRTUAL MACHINE TO A DESTINATION VIRTUAL MACHINE WHILE CONTINUE THE EXECUTION OF THE OPERATION ON THE ORIGIN VIRTUAL MACHINE

(75) Inventor: Ezekiel Kruglick, Poway, CA (US)

(73) Assignee: Empire Technology Development, LLC, Wilmington, DE (US)

( * ) Notice: Subject to any disclaimer, the term of this patent is extended or adjusted under 35 U.S.C. 154(b) by 667 days.

(21) Appl. No.: 13/497,529

(22) PCT Filed: Sep. 13, 2011

(86) PCT No.: PCT/US2011/051387
§ 371 (c)(1),
(2), (4) Date: Mar. 21, 2012

(87) PCT Pub. No.: WO2013/147777
PCT Pub. Date: Oct. 3, 2013

(65) Prior Publication Data
US 2013/0067471 A1   Mar. 14, 2013

(51) Int. Cl.
*G06F 9/455* (2006.01)
*G06F 9/48* (2006.01)

(52) U.S. Cl.
CPC .......... *G06F 9/4856* (2013.01); *G06F 9/45558* (2013.01); *G06F 2009/4557* (2013.01)

(58) Field of Classification Search
CPC ............. G06F 9/45558; G06F 9/4856; G06F 2009/4557
USPC ...................... 718/1; 711/203, 207, E12.058, 711/E12.065; 811/206
See application file for complete search history.

(56) References Cited

U.S. PATENT DOCUMENTS

| | | | |
|---|---|---|---|
| 7,392,317 B2 | 6/2008 | Halpern | |
| 8,458,284 B2* | 6/2013 | Huang et al. | 709/213 |
| 8,458,696 B2* | 6/2013 | Park et al. | 718/1 |
| 2007/0277021 A1 | 11/2007 | O'Connor et al. | |
| 2008/0222375 A1* | 9/2008 | Kotsovinos et al. | 711/162 |
| 2008/0222633 A1* | 9/2008 | Kami | 718/1 |
| 2009/0070760 A1 | 3/2009 | Khatri et al. | |
| 2009/0119493 A1 | 5/2009 | Venkitachalam et al. | |
| 2009/0150864 A1 | 6/2009 | Meijer et al. | |
| 2009/0300604 A1* | 12/2009 | Barringer | 717/178 |
| 2010/0070725 A1 | 3/2010 | Prahlad et al. | |
| 2010/0153617 A1 | 6/2010 | Miroshnichenko | |
| 2010/0318608 A1 | 12/2010 | Huang et al. | |
| 2011/0066597 A1* | 3/2011 | Mashtizadeh et al. | 707/640 |
| 2011/0179415 A1* | 7/2011 | Donnellan et al. | 718/1 |

(Continued)

FOREIGN PATENT DOCUMENTS

KR   10-2010-0123847 A   11/2010

OTHER PUBLICATIONS

United States Patent and Trademark Office, International search report and written opinion of the international searching authority, mailed on Jan. 6, 2012.

(Continued)

*Primary Examiner* — Meng An
*Assistant Examiner* — Abu Ghaffari

(57) ABSTRACT

Technologies and implementations for transferring operation from an origin virtual machine to a destination virtual machine while the origin virtual machine continues to execute an origin executable are generally disclosed.

19 Claims, 7 Drawing Sheets

(56) References Cited

U.S. PATENT DOCUMENTS

2012/0254862 A1* 10/2012 Dong .............................. 718/1
2014/0189816 A1 7/2014 Halperin et al.

OTHER PUBLICATIONS

Voorsluys, William, et al., Cost of virtual machine live migration in clouds: a performance evaluation, accessed online on Jan. 25, 2012 via cloudbus.org/reports/VM-Migration-Cloud2009.pdf.
Amazon Web Services, Running high-CPU or high-memory applications on AWS elastic beanstalk, Amazon Web Services, Jan. 28, 2011 via aws.amazon.com/articles/6556616855019735.
Desrocher, Jonathan, Adding resources (resizing) an AWS EC2 instance, CloudStacking, Aug. 9, 2010 via cloudstacking.com/?p=478.
Brutlag, Jake, Speed matters, Research Blog, Jun. 23, 2009 via googleresearch.blogspot.com/2009/06/speed-matters.html.
Shimpi, Anand Lal, Intel plans on bringing atom to servers in 2012, 20W SNC Xeons in 2011, AnandTech, Mar. 15, 2011 via anandtech.com/show/4222/intel-plans-on-bringing-atom-to-servers-in-2012-20w-snb-xeons-in-2011.
Bradford, Robert, et al., Live wide-area migration of virtual machines including local persistent state, Proceedings of the 3rd international conference on Virtual execution environments, Jun. 13-15, 2007, 169-179, ACM, New York, NY, USA.
Warfield, Andrew, et al., Facilitating the development of soft devices, 2005 USENIX annual technical conference, 2005, 379-382, USENIX Association, Berkeley, CA, USA.
Perkins, C., IP encapsulation within IP, RFC 2003, Oct. 1996 via http://www.ietf.org/rfc/rfc2003.txt.
Wellington, B., Secure domain name system (DNS) dynamic update, RFC 3007, Nov. 2000 via ietf.org/rfc/rfc3007.txt.
Amazon Web Services, Amazon EC2 pricing, Amazon web services, Mar. 24, 2011 via amazon.com/ec2/pricing/.
Amazon Web Services, Amazon EC2 FAQs, Amazon web services, Mar. 24, 2011 via amazon.com/ec2/faqs/.
Hookway, Raymond J. And Herdeg, Mark A., Digital FX!32: combining emulation and binary translation, Digital Technical Journal, 1997, 3-12, 9(1), Digital Equipment Corp., Action, MA, USA.
Fallin, Chris and Craik, Chris, Lightweight page migration for improved system throughout, Accessed Mar. 20, 2012 via ece.cmu.edu/~cfallin/18740/report.pdf.
Corbalan, Julita, et al., Evaluation of the memory p. migration influence in the system performance: the case of the SGI 02000, ICS '03 proceedings of the 17th annual international conference on Supercomputing, 2003, 121-129, ACM, New York, NY, USA.
Sites, Richard L., et al., Binary translation, Communications of the ACM, Feb. 1993, 69-81, 36(2), ACM, New York, NY, USA.
Dehnert, James C., et al., The Transmeta Code Morphing software: using speculation, recovery, and adaptive retranslation to address real-life challenges, Proceedings of the international symposium on Code generation and optimization: feedback-directed and runtime optimization, 2003, 15-24, IEEE Computer Society, Washington, DC, USA.
Ebcioglu, Kemal and Altman, Erik R., Daisy: dynamic compilation for 100% architectural compatibility, Proceedings of the 24th annual international symposium on Computer architecture, 1997, 26-37, ACM, New York, NY, USA.
Bala, Vasanth, et al., Dynamo: a transparent dynamic optimization system, Proceedings of the ACM SIGPLAN 2000 conference on Programming language design and implementation, Jun. 2000, 1-12, ACM, New York, NY, USA.
Albonesi, David H., Selective cache ways: on-demand cache resource allocation, Proceedings of the 32nd annual ACM/IEEE international symposium on Microarchitecture, Nov. 1999, 248-259, IEEE Computer Society, Washington, DC, USA.
Microsoft, Microsoft.net, Accessed on Mar. 20, 2012 via microsoft.com/net/.
Baraz, Leonid, et al., IA-32 execution layer: a two-phase dynamic translator designed to support IA-32 applications on Itanium-based systems, Proceedings of the 36th annual IEEE/ACM International Symposium on Microarchitecture, Dec. 2003, 191, IEEE Computer Society, Washington, DC, USA.
"Kvm—kernel based virtual machine," Red Hat Linux, pp. 11 (2009).
"What I Would Change about Microsoft Windows Azure," accessed at web.archive.org/web/20110525023222/cloud-computing.learningtree.com/2010/08/19/what-i-would-change-about-microsoft-windows-azure/, published on Aug. 19, 2010, pp. 1-2.
Hammond, E., "Move a Running EBS Boot Instance to New Hardware on Amazon EC2," accessed at web.archive.org/web/20110909143405/alestic.com/2010/05/ec2-move-ebs-boot-instance, posted May 4, 2010, pp. 1-4.

* cited by examiner

600 A computer program product.

602 A signal bearing medium.

604 Machine-readable instructions, which, if executed by one or more processors, operatively enable a computing device to:

launch a destination executable on a destination virtual machine while an origin virtual machine continues to execute an origin executable, wherein the destination virtual machine has different characteristics from the origin virtual machine;

transfer persistent state data from the origin virtual machine to the destination virtual machine;

transfer delta data from a delta queue associated with the origin virtual machine to the destination virtual machine while the origin virtual machine continues to execute the origin executable; and/or switch from the origin virtual machine to the destination virtual machine when the launching of the destination executable has been completed and the delta queue is empty.

| 606 a computer-readable medium. | 608 a recordable medium. | 610 a communications medium. |
|---|---|---|

FIG. 6

OPERATION TRANSFER FROM AN ORIGIN VIRTUAL MACHINE TO A DESTINATION VIRTUAL MACHINE WHILE CONTINUE THE EXECUTION OF THE OPERATION ON THE ORIGIN VIRTUAL MACHINE

CROSS-REFERENCE TO RELATED APPLICATIONS

The present application is a U.S. national stage application filing under 35 U.S.C. §371 claiming the benefit of International Application No. PCT/US2011/051387, filed on Sep. 13, 2011, the entire contents of which are incorporated herein by reference.

BACKGROUND

Unless otherwise indicated herein, the approaches described in this section are not prior art to the claims in this application and are not admitted to be prior art by inclusion in this section.

Current cloud computing services may be stopped and then restarted over again when moving between virtual machines that have different capabilities such as memory and API types. Accordingly, components that can't be distributed between servers (e.g., as may often be the case with database services) may be run on the largest hardware virtual machine so that they can reasonably handle peak usage conditions. The alternative to selecting virtual machines based on peak usage conditions is to face a significant delay and loss of transient state data. Such delay and loss of transient state data may be due to services being stopped and then restarted during switchovers to larger hardware virtual machines.

Accordingly, current cloud computing services may typically be run at all times on virtual machines selected to be capable of handling peak usage conditions. However, virtual machines selected to be capable of handling peak usage conditions may only need maximum resources for less than five percent of the time. For example, Amazon Elastic Compute Cloud (EC2) pricing takes advantage of this to some degree with a "large" virtual machine priced at four times the price of a "small" virtual machine and an "extra large" virtual machine priced at eight times the price of a "small" virtual machine.

SUMMARY

Some example methods, apparatus, and systems related to transferring operation from an origin virtual machine to a destination virtual machine may be implemented in a cloud computing system. Such a cloud computing system may include several modules. A first module may be configured to generate an origin pointer index associated with an origin executable, where the origin executable is configured to be executed on an origin virtual machine. A second module may be configured to generate a destination pointer index associated with a destination executable, where the destination virtual machine has different characteristics from the origin virtual machine. Such a destination executable may be configured to be executed on a destination virtual machine. A third module may be configured to transfer persistent state data from the origin virtual machine to the destination virtual machine. A fourth module may be configured to transfer delta data from a delta queue associated with the origin virtual machine to the destination virtual machine while the origin virtual machine continues to execute the origin executable. The fourth module may be configured to transfer delta data based at least in part on the origin pointer index and the destination pointer index.

Some example methods may include operations for transferring operation from an origin virtual machine to a destination virtual machine. Such operations may launch a destination executable on a destination virtual machine while an origin virtual machine may continue to execute an origin executable, where the destination virtual machine may have different characteristics from the origin virtual machine. Persistent state data may be transferred from the origin virtual machine to the destination virtual machine. Delta data may be transferred from a delta queue associated with the origin virtual machine to the destination virtual machine while the origin virtual machine may continue to execute the origin executable. A switch from the origin virtual machine to the destination virtual machine may be performed when the launching of the destination executable has been completed and the delta queue is empty.

Some example articles may include machine-readable instructions for transferring operation from an origin virtual machine to a destination virtual machine. Such machine-readable instructions may launch a destination executable on a destination virtual machine while an origin virtual machine may continue to execute an origin executable, where the destination virtual machine may have different characteristics from the origin virtual machine. Persistent state data may be transferred from the origin virtual machine to the destination virtual machine. Delta data may be transferred from a delta queue associated with the origin virtual machine to the destination virtual machine while the origin virtual machine may continue to execute the origin executable. A switch from the origin virtual machine to the destination virtual machine may be performed when the launching of the destination executable has been completed and the delta queue is empty.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 6 is an illustration of an example computer program product that is arranged in accordance with at least some embodiments of the present disclosure.

DETAILED DESCRIPTION

Figure 1:
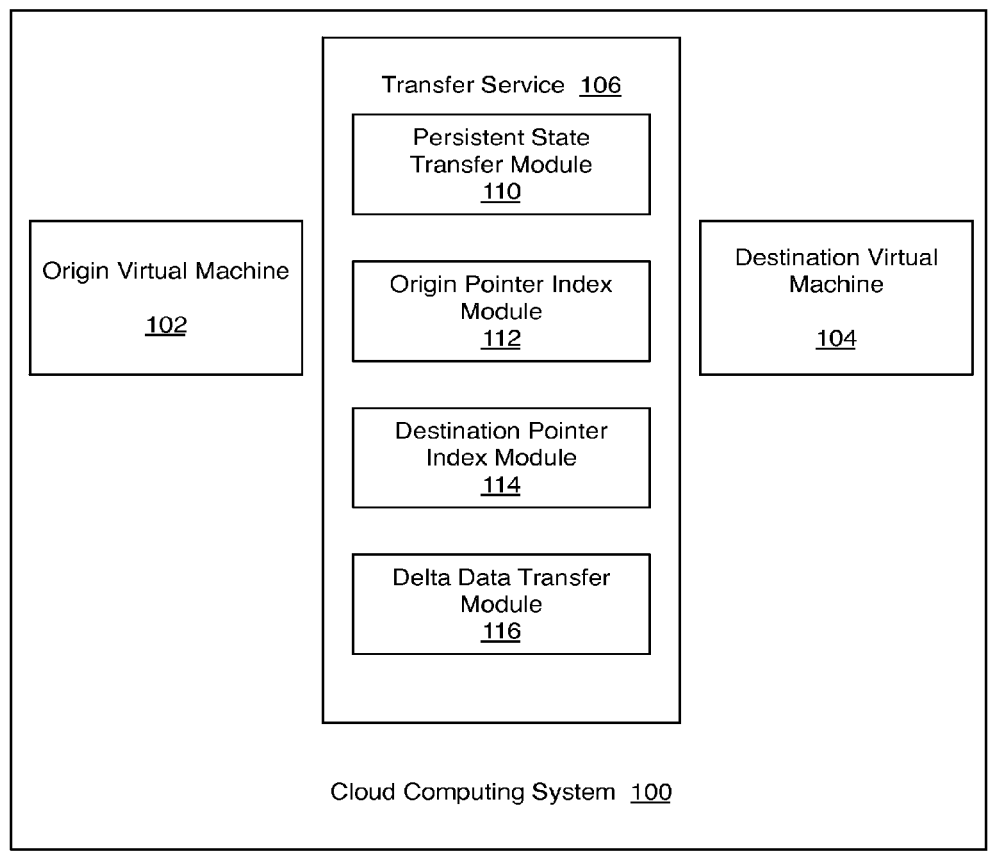
FIG. 1 illustrates a schematic diagram of an example cloud computing system that is arranged in accordance with at least some embodiments of the present disclosure.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to transferring operation from an origin virtual machine to a destination virtual machine while the origin virtual machine continues to execute an origin executable.

To avoid stopping and restarting cloud computing services when moving between virtual machines of different capabilities, current cloud computing services may typically be run at all times on virtual machines selected to be capable of handling peak usage conditions. As will be discussed in greater detail below, instead of stopping and restarting cloud computing services when moving between virtual machines of different capabilities, a transfer of operation from an origin virtual machine to a destination virtual machine may be possible while the origin virtual machine continues to execute an origin executable.

As will be discussed in greater detail below, transferring operation from an origin virtual machine to a destination virtual machine may be performed "on-the-fly." In some examples, such a transfer of operations may occur where the origin virtual machine and the destination virtual machine have different characteristics, such as, by way of example, the origin virtual machine being 32-bit based while the destination virtual machine is 64-bit based, or the origin virtual machine and the destination virtual machine having processors with different memory models altogether, or the like. Such transferring operation may include a combined strategy of booting a new service that is native to the destination virtual machine along with an origin and destination pair of pointer indexes that may allow translation between memory models. For example, such an origin and destination pair of pointer indexes may be utilized for memory translation to allow live service transfer to higher or lower capability virtual machines.

FIG. 1 illustrates a schematic diagram of an example cloud computing system 100 that is arranged in accordance with at least some embodiments of the present disclosure. As illustrated, cloud computing system 100 may be organized to include one or more virtual machines, such as an origin virtual machine 102 and/or a destination virtual machine 104. As used herein, the term "cloud computing system" may refer to two or more computing devices (e.g., servers) configured to be in communication with one another via a network (e.g., the Internet) and in operation together so as to act as a shared pool of configurable computing resources that can be provisioned to an end-user without requiring end-user knowledge of the physical location and/or configuration of the system that delivers the services. As used herein the term "virtual machine" may refer to a software implementation that operates in a cloud computing environment so as to mimic the operation of a physical computing device. For example, such cloud computing systems may execute a software implementation as a virtual machine to mimic the operation of a physical computing device by making a single physical resource (e.g., a server, an operating system, an application, storage device, the like, and/or combinations thereof) appear to function as multiple logical resources; or making multiple physical resources (e.g., storage devices, servers, the like, and/or combinations thereof) appear as a single logical resource.

In some examples, cloud computing system 100 may transfer operation from origin virtual machine 102 to destination virtual machine 104. In such an example, cloud computing system 100 may include a transfer service 106 that may include several modules. In the illustrated example, transfer service 106 sets forth various functional modules, which may be performed by hardware, software, and/or firmware. Those skilled in the art in light of the present disclosure will recognize that numerous alternatives to the functional modules shown in FIG. 1 may be practiced in various implementations. For example, although transfer service 106, as shown in FIG. 1, may comprise one particular organization of functions distributed into the set of functional modules, the organization of these functions among one or more functional modules does not necessarily limit claimed subject matter to any particular organization. Likewise, intervening functions not shown in FIG. 1 and/or additional functions not shown in FIG. 1 may be employed and/or some of the functions shown in FIG. 1 may be eliminated, without departing from the scope of claimed subject matter.

As illustrated, transfer service 106 may include a persistent state transfer module 110, an origin pointer index module 112, a destination pointer index module 114, and/or a delta data transfer module 116. Persistent state transfer module 110 may be configured to transfer persistent state data from origin virtual machine 102 to destination virtual machine 104. Destination virtual machine 104 may have different characteristics from origin virtual machine 102. As used herein, the term "different characteristics" may refer to variations that may include variations in a memory capacity-type characteristic, variations in a processing capacity-type characteristic, variations in an application programming interface-type characteristic, variations in an address-type characteristic, variations in an operating system-type characteristic, the like, and/ or combinations thereof. Even in cases where origin virtual machine 102 and destination virtual machine 104 have different characteristics, the persistent disk state may be utilized in the same format for both origin virtual machine 102 and destination virtual machine 104.

Origin pointer index module 112 may be configured to generate an origin pointer index associated with an origin executable. Such an origin executable may be configured to be executed on origin virtual machine 102. Additional details regarding the origin executable and origin pointer index are discussed below with regard to FIG. 2.

Destination pointer index module 114 may be configured to generate a destination pointer index associated with a destination executable. As mentioned above, destination virtual machine 104 may have different characteristics from origin virtual machine 102. Accordingly, such a destination executable may be configured to be executed on destination virtual machine 104, as opposed to being configured for execution on origin virtual machine 102. Additional details regarding the destination executable and destination pointer index are discussed below with regard to FIG. 2.

Delta data transfer module 116 may be configured to transfer delta data from a delta queue associated with origin virtual machine 102 to destination virtual machine 104. As used herein, the term "delta data" may refer to environmental state data that is not associated with persistent state memory, such as environmental state data that is associated with dynamic state memory, and may also refer to persistent state data for disk updates as long as the persistent state data transfer between virtual machines is in progress. In some examples, such a transfer of delta data from origin virtual machine 102 to destination virtual machine 104 may occur while origin virtual machine 102 continues to execute the origin executable. Delta data transfer module 116 may be configured to transfer delta data based at least in part on the origin pointer index and the destination pointer index.

In operation, the transfer of data between origin virtual machine 102 and destination virtual machine 104 may involve matching the environmental state (e.g., including persistent state memory and dynamic state memory) as well as the program state (e.g., the line of code the executable is currently processing). Persistent state transfer module 110 may be utilized to transfer persistent state-type environmental state data from origin virtual machine 102 to destination virtual machine 104. However, as destination virtual machine 104 may have different characteristics from origin virtual machine 102, the locations within the origin executable associated with dynamic state data and program state data may not be the same locations within the destination executable. Accordingly, delta data transfer module 116 may be configured to adjust for location variation between origin virtual machine 102 and destination virtual machine 104 during the transfer of delta data (e.g., dynamic state-type environmental state data). For example, delta data transfer module 116 may utilize the origin pointer index and the destination pointer index in combination to transfer delta data (e.g., dynamic state-type environmental state data) from origin virtual machine 102 to destination virtual machine 104. Additionally or alternatively, delta data transfer module 116 may utilize the origin pointer index and the destination pointer index in combination to adjust for location variation between origin virtual machine 102 and destination virtual machine 104 to translate the program state data (e.g., what line of code the origin executable is currently processing). Additional details regarding the transfer of data between origin virtual machine 102 and destination virtual machine 104 are discussed below with regard to FIG. 3.

Figure 2:
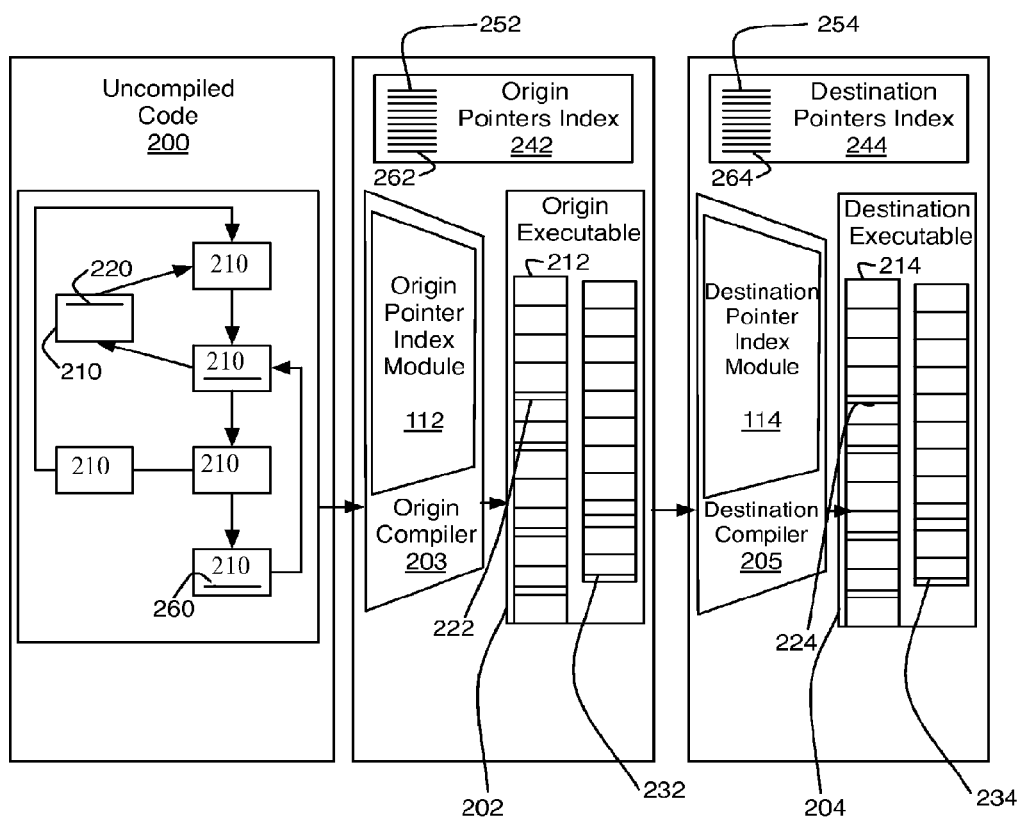
FIG. 2 illustrates a schematic diagram of an example generation of origin and destination pointer indexes that is arranged in accordance with at least some embodiments of the present disclosure.

FIG. 2 illustrates a schematic diagram of an example generation of origin and destination pointer indexes that is arranged in accordance with at least some embodiments of the present disclosure. In the illustrated example, an uncompiled code 200 may be compiled via an origin compiler 203 into an origin executable 202 and may be compiled via a destination compiler 205 into a destination executable 204. For example, destination virtual machine 104 (see, e.g., FIG. 1) may have different characteristics from origin virtual machine 102 (see, e.g., FIG. 1). Accordingly, destination executable 204 may be configured to be executed on destination virtual machine 104 (see, e.g., FIG. 1), as opposed to being configured for execution on origin virtual machine 102 (see, e.g., FIG. 1).

Uncompiled code 200 may include various procedures, application programming interface (API) calls, and/or functions (referred to generally hereafter as procedures 210). Uncompiled code 200 may be compiled via origin compiler 203 into origin executable 202 with an arrangement of procedures 210 into origin procedures 212. Similarly, uncompiled code 200 may be compiled via destination compiler 205 into origin executable 202 with an arrangement of procedures 210 into destination procedures 214.

In some examples, certain transfer points 220 may be identified from uncompiled code 200. Such transfer points 220 may be utilized to identify when switching operation from origin virtual machine 102 (see, e.g., FIG. 1) to destination virtual machine 104 (see, e.g., FIG. 1) would be acceptable. Such transfer points 220 may be identified by origin compiler 203 and/or by destination compiler 205. Such transfer points 220 may represent the same place in the logic and loop flow for both destination virtual machine 104 (see, e.g., FIG. 1) and origin virtual machine 102 (see, e.g., FIG. 1), so both compilers 203 and 205 get the same transfer points. Such an operation may be done either by having both compilers 203 and 205 use the same algorithm to determine transfer points 220 (e.g., by explicitly defining transfer points 220 in code), or by using an algorithmic tool to add transfer points 220 to uncompiled code 200 before compiling. For example, origin compiler 203 may identify transfer points 220 and insert corresponding origin bookmark locations 222 into origin executable 202. Similarly, destination compiler 205 may identify transfer points 220 and insert corresponding destination bookmark locations 224 into destination executable 204. As mentioned previously, destination virtual machine 104 (see, e.g., FIG. 1) may have different characteristics from origin virtual machine 102 (see, e.g., FIG. 1). Accordingly, the position of destination bookmark locations 224 within destination executable 204 may not correspond to the respective position of origin bookmark locations 222 in origin executable 202.

In some examples, certain uses of memory may be identified from uncompiled code 200, such as variable declarations, procedure calls, and/or procedure returns (referred to generally hereafter as variables 230). Such variables 230 may be gathered as delta data during dynamic data transfer when switching operation from origin virtual machine 102 (see, e.g., FIG. 1) to destination virtual machine 104 (see, e.g., FIG. 1). Such variables 230 may be associated with an origin variable location 232 in origin executable 202. Similarly, such variables 230 may be associated with a destination variable location 234 in destination executable 204. As mentioned previously, destination virtual machine 104 (see, e.g., FIG. 1) may have different characteristics from origin virtual machine 102 (see, e.g., FIG. 1). Accordingly, the position of destination variable locations 234 within destination executable 204 may not correspond to the respective position of origin variable locations 232 in origin executable 202.

Origin compiler 203 may include origin pointer index module 112. Origin pointer index module 112 may be configured to generate an origin pointer index 242 associated with origin executable 202. Similarly, destination compiler 205 may include destination pointer index module 114. Destination pointer index module 114 may be configured to generate a destination pointer index 244 associated with destination executable 204.

As discussed above, the position of destination bookmark locations 224 in destination executable 204 may not correspond to the respective position of origin bookmark locations 222 in origin executable 202. Accordingly, origin pointer index 242 may include a multiple number of origin bookmark pointers 252. For example, such origin bookmark pointers 252 may be associated with individual points (e.g., origin bookmark locations 222) within origin executable 202 designated as logical points to switch from origin virtual machine 102 (see, e.g., FIG. 1). Similarly, destination pointer index 244 may include a multiple number of destination bookmark pointers 254. For example, Individual destination bookmark pointers 254 may indicate the equivalent position in destination executable 204 for the equivalent origin bookmark pointer 252 in the origin pointer index 242.

As discussed above, the position of destination variable locations 234 within destination executable 204 may not correspond to the respective position of origin variable locations 232 in origin executable 202. Accordingly, origin pointer index 242 may include a multiple number of origin persistent pointers 262. For example, such origin persistent pointers 262 may be associated with corresponding origin variables (e.g., via origin variable location 232), where origin persistent pointers 262 may indicate where corresponding origin variable locations 232 are located in the origin executable 202. Additionally, origin variable locations 232 themselves may operate as origin variable pointers, where such origin variable pointers may indicate where corresponding origin variables are located in an origin memory (not shown). Similarly, destination pointer index 244 may include a multiple number of destination persistent pointers 264. For example, such destination persistent pointers 264 may be associated with corresponding destination variables (e.g., via origin variable location 232), where destination persistent pointers 264 may indicate where corresponding destination variable locations 234 are located in the destination executable 204. Additionally, destination variable locations 234 themselves may operate as origin variable pointers, where such origin variable pointers may indicate where corresponding origin variables are located in a destination memory (not shown).

Accordingly, data regarding a given variable stored in memory may be pointed to from destination executable 204 via a corresponding destination variable location 234, while the position of destination variable location 234 may be pointed to from destination pointer index 244 via a corresponding destination persistent pointer 264. Likewise, data regarding a given variable stored in memory may be pointed to from origin executable 202 via a corresponding origin variable location 232, while the position of origin variable location 232 may be pointed to from origin pointer index 242 via a corresponding origin persistent pointer 262. Additional details regarding the transfer of data between origin virtual machine 102 (see, e.g., FIG. 1) and destination virtual machine 104 (see, e.g., FIG. 1) are discussed below with regard to FIG. 3.

In operation, origin pointer index module 112 and destination pointer index module 114 may, at compile time, generate pointer indexes 242 and 244 that may contain persistent pointers 262 and 264 to variables used in the code. For example, when code is compiled the executable binary code may typically convert variables to access pointer storage so that when memory space is dynamically allocated a pointer (e.g., origin variable pointers and/or destination variable pointers) can be stored linking to wherever the operating system (OS) dynamic memory allocation happens to put the variable contents. Variables that do not operate in this way may include type-defined globals. Pointer indexes 242 and 244 generated at compile time may include persistent pointers 262 to the origin variable pointers (e.g., pointers to pointers). Additionally or alternatively, pointer indexes 242 and 244 may include pointers to any pre-allocated globals as well. Pointer indexes 242 and 244 may not include a copy of the origin variable pointers and/or destination variable pointers, but rather may include pointers to where in the executable code one can find the origin variable pointers and/or destination variable pointers. Thus, accessing a variable through the pointer indexes 242 and 244 may involve a multi-step process of looking an address up in the pointer indexes 242 and 244 and following it to the destination variable pointers, which might then be followed to access the actual value. Such pointer indexes 242 and 244 may allow one to find the same variable in memory for differently compiled executables on different memory modeled systems.

In operation, uncompiled code 200 may use variable declarations 230 that may be dynamically declared (as well as procedure call and return points). Such uncompiled code 200 may be compiled for both different virtual machine characteristics (e.g., a 32-bit environment and a 64-bit environment). The resulting compiled origin executable 202 (e.g., 32-bit) and compiled destination executable 204 (e.g., 64-bit) may be significantly different as they use different libraries, different memory models, and likely some different procedure versions. Origin pointer index module 112 and destination pointer index module 114 may be utilized to generate pointer indexes 242 and 244, respectively, to the variables used in origin executable 202 and destination executable 204. Pointer indexes 242 and 244 may not point to the variables themselves (which may not be allocated until well into runtime) but rather point to the places within origin executable 202 and destination executable 204 which will contain executable pointers 232 and 234 to the ultimate variable locations. The pointer indexes 242 and 244 may be considered an index that allows one to find the same variables in two differently compiled versions of the same code. This pointer-to-pointers approach may work for even complex variable types like pointer linked lists (e.g., pointer linked lists which may be iterated through), expandable arrays, and/or the like.

Figure 3:
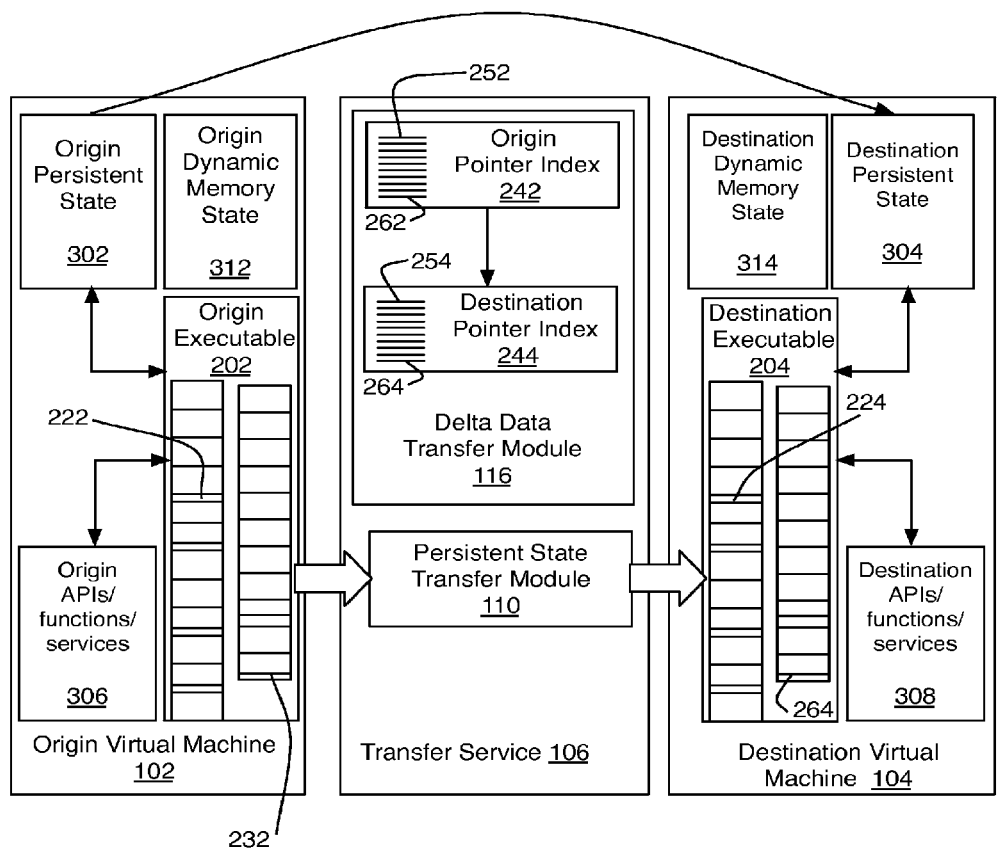
FIG. 3 illustrates a schematic diagram of an example transfer of data from an origin virtual machine to a destination virtual machine that is arranged in accordance with at least some embodiments of the present disclosure.

FIG. 3 illustrates a schematic diagram of an example transfer of data from origin virtual machine 102 to a destination virtual machine 104 that is arranged in accordance with at least some embodiments of the present disclosure. The transfer of data between origin virtual machine 102 and destination virtual machine 104 may involve matching the environmental state (e.g., including persistent state memory and dynamic state memory) as well as the program state (e.g., equivalent origin and destination executable pointers indicating what line of code origin executable 202 is currently processing).

Persistent state transfer module 110 may be utilized to transfer persistent state-type environmental state data from origin virtual machine 102 to destination virtual machine 104. For example, persistent state transfer module 110 may be utilized to transfer persistent state-type environmental state data from an origin persistent state 302 to a destination persistent state 304. In some examples, persistent state transfer module 110 may copy origin persistent state 302 (such as disk storage) to destination persistent state 304 via delta detection and updating for consistency and/or the like. See for example, R. Bradford et al., "Live wide-area migration of virtual machines including local persistent state," in Proceedings of the 3rd international conference on Virtual execution environments (ACM, 2007), 169-179.

While persistent state transfer module 110 may transfer persistent state-type environmental state data from origin persistent state 302 to destination persistent state 304, persistent state transfer module 110 may additionally be configured to launch a copy of the destination-appropriate binary (e.g., destination executable 204) instead of directly copying the origin-appropriate binary (e.g., origin executable 202). For example, origin executable 202 may be a 32-bit executable, by way of example, while destination executable 204 may be a 64-bit executable, rendering the origin-appropriate binary (e.g., origin executable 202) unsuitable for destination virtual machine 104. Such a launch-instead-of-copy approach may save bandwidth during virtual machine migration. However, such a launch-instead-of-copy approach may be unconventional as such an approach may normally leave one unable to copy origin dynamic memory state 312 without additional procedures (e.g., such as procedures that may be describe in greater detail below with regard to FIGS. 4 and/or 5).

As destination virtual machine 104 may have different characteristics from origin virtual machine 102, the locations within origin executable 202 associated with dynamic state data and program state data likely will not be the same locations within destination executable 204. Accordingly, delta data transfer module 116 may be configured to adjust for location variation between origin virtual machine 102 and destination virtual machine 104 during the transfer of delta data (e.g., dynamic state-type environmental state data). For example, delta data transfer module 116 may utilize origin pointer index 242 and destination pointer index 244 in combination to transfer delta data (e.g., dynamic state-type environmental state data) from origin virtual machine 102 to destination virtual machine 104. For example, delta data transfer module 116 may utilize origin pointer index 242 and destination pointer index 244 in combination to transfer delta data from an origin dynamic memory state 312 to a destination dynamic memory state 314.

In operation, delta data transfer module 116 may gather past delta data from a delta queue (not shown) associated with the origin virtual machine. For example, delta data transfer module 116 may gather past delta data from origin dynamic memory state 312. In some examples, delta data may be gathered via delta data-update based techniques and/or live network connection transfer techniques. For example, virtual machine (VM) migration techniques may include systems for moving the disk image, virtual machine image, and memory state information. In such an example a copy may be made of the disk state, the virtual machine, and/or the memory state while capturing any changes that occur after the time of copy (e.g., delta data). As a further example, a Xen-type hypervisor may incorporate a split driver architecture for block devices to allow use of a raw block device (blkfront) interception of messages to storage. The block tap (blktap) framework can thus be used to generate change maps or "delta data" once copying starts and thus keep the destination state information updated. In such an example, whenever the delta queue is empty, the two machines are in sync. See for example, A. Warfield, S. Hand, K. Fraser and T. Deegan, "Facilitating the Development of Soft Devices", in USENIX, 2005. Additionally, a virtual machine hypervisor may support commands like "iproute2" which may establish an IP tunnel for network redirection until the Dynamic Domain Name System (DNS) entry for the service can be updated. See for example, C. Perkins, "IP encapsulation within IP", 1996, RFC 2003 and/or B. Wellington, "Secure DNS Dynamic Update", RFC 3007. In such cases, a service may have two addresses for a while (the old address responding to requests that have not yet processed the address update, and the new address for new connections and updated requestors) until all requestors have updated.

In some examples, delta data transfer module 116 may request dynamic memory allocations for variables as they are copied. Delta data transfer module 116 may locate an origin variable read location (e.g., origin variable location 232) by looking up the gathered past delta data in origin pointer index 242. For example, delta data transfer module 116 may locate origin variable location 232 by looking up the gathered past delta data in origin pointer index 242 based at least in part on persistent pointers 262. Delta data transfer module 116 may determine a destination write location by referring through destination pointer index 244 based at least in part on the origin variable read location (e.g., origin variable location 232). For example, delta data transfer module 116 may determine a destination write location by referring through destination pointer index 244 based at least in part on persistent pointers 264. Delta data transfer module 116 may write a memory state in destination memory state 314 based at least in part on such a destination write location.

Additionally or alternatively, delta data transfer module 116 may utilize origin pointer index 242 and destination pointer index 244 in combination to adjust for location variation between origin virtual machine 102 and destination virtual machine 104 to translate the program state data (e.g., what line of code origin executable 202 is currently processing). For example, bookmark pointers 252 of origin pointer index 242 may be associated with individual points within origin executable 202 designated as logical points (e.g., origin bookmark locations 222) to switch from origin virtual machine 102. For example, bookmark pointers 252 may be associated with frequent execution points (e.g., such as each procedure and/or function call) and the actual transfer may be made when the execution location of origin virtual machine 102 is at one of these points.

Similarly, bookmark pointers 254 of destination pointer index 244 may be associated with individual points within the destination executable designated as logical points (e.g., destination bookmark locations 224) to switch to destination virtual machine 104. In operation, delta data transfer module 116 may adjust for location variation between origin virtual machine 102 and destination virtual machine 104 by referring through bookmark pointers 252 of origin pointer index 242 to bookmark pointers 254 of destination pointer index 244. Once the environmental state of origin virtual machine 102 and destination virtual machine (e.g., including matched persistent state memory and dynamic state memory having return coordinates and state all translated to be compatible with the destination executable 204) are matched, any procedure call may be a viable point to transfer the process. Thus, transfer may be triggered when the delta queue is empty, when execution of origin executable 202 is at an indexed bookmark pointer, and when destination executable 204 has finished launching.

In the illustrated example, origin virtual machine 102 and destination virtual machine 104 may have their own version of APIs, functions, and/or system services (e.g., origin APIs, functions, and/or system services 306 and destination APIs, functions, and/or system services 308). Such APIs, functions, and/or system services 306 and 308 may become available when destination virtual machine 104 is booted in preparation for moving the service. The same or similar APIs and libraries may be generally available on each virtual machine type.

Figure 4:
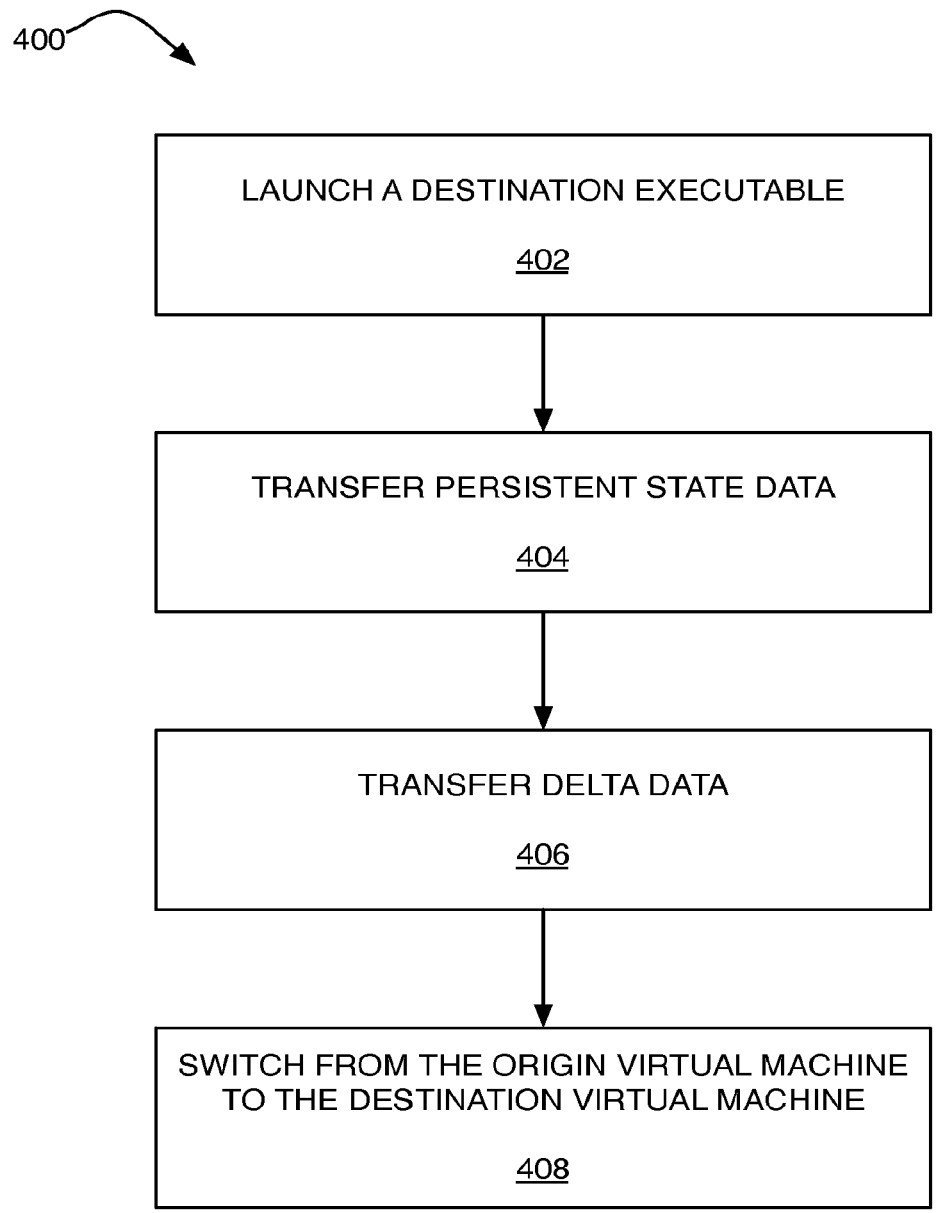
FIG. 4 illustrates an example process for transferring operation from an origin virtual machine to a destination virtual machine that is arranged in accordance with at least some embodiments of the present disclosure.

FIG. 4 illustrates an example process 400 for transferring operation from an origin virtual machine to a destination virtual machine that is arranged in accordance with at least some embodiments of the present disclosure. In the illustrated example, process 400, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 4 may be practiced in various implementations. For example, although process 400, as shown in FIG. 4, may comprise one particular order of blocks or actions, the order in which these blocks or actions are presented does not necessarily limit claimed subject matter to any particular order. Likewise, intervening actions not shown in FIG. 4 and/or additional actions not shown in FIG. 4 may be employed and/or some of the actions shown in FIG. 4 may be eliminated, without departing from the scope of claimed subject matter. Process 400 may include one or more of functional operations as indicated by example operations 402, 404, 406, and/or 408.

As illustrated, process 400 may be implemented for transferring operation from an origin virtual machine to a destination virtual machine (see, e.g., FIG. 1). Processing may begin at operation 402, "LAUNCH A DESTINATION EXECUTABLE", where a destination executable on may be launched on a destination virtual machine. For example, a destination executable may be launched on a destination virtual machine while an origin virtual machine may continue to execute an origin executable. In some examples, the destination virtual machine may have different characteristics from the origin virtual machine. In some examples, the launching of the destination executable on the destination virtual machine may include running the destination executable with an initially empty memory during declaration of variables and during a determination of memory locations associated with the declared variables. For example, the destination executable may access an initially empty memory (e.g., either a memory that is completely empty or a memory that includes preliminary dummy data) and set up variables so as to allocate memory and to generate variables (e.g., such variables may be used with the origin and/or destination pointer indexes to perform find and replace operations with origin data). In such an example, the destination executable may be running as close to the origin executable as possible prior to transfer of persistent state data and/or delta data, at which point a hypervisor might freeze the destination executable until transfer of the persistent state data and delta data is complete.

Processing may continue from operation 402 to operation 404, "TRANSFER PERSISTENT STATE DATA", where persistent state data may be transferred. For example, persistent state data may be transferred from the origin virtual machine to the destination virtual machine.

Processing may continue from operation 404 to operation 406, "TRANSFER DELTA DATA", where delta data may be transferred. For example, delta data may be transferred from a delta queue associated with the origin virtual machine to the destination virtual machine. In some examples, such a transfer of delta data may be done while the origin virtual machine may continue to execute the origin executable. In some examples, transferring dynamic state data in bulk may be done prior to transfer of delta data (or simultaneous to an initial transfer of delta data), and then the transfer of delta data may be performed to keep the dynamic state data updated.

In some examples, such a transfer of the delta data may further include transferring the delta data from the origin virtual machine to the destination virtual machine based at least in part on an origin pointer index. For example, the origin pointer index may include multiple persistent pointers associated with corresponding origin variables. In such an example, the persistent pointers may indicate where corresponding origin variable pointers are located in the origin executable, and the origin variable pointers may indicate where corresponding origin variables are located in an origin memory. Thus, the transfer of delta data may include iterating through the origin pointer index.

In some examples, such a transfer of the delta data may further include transferring the delta data from the origin virtual machine to the destination virtual machine based at least in part on a destination pointer index. For example, the destination pointer index may include multiple persistent pointers associated with corresponding destination variables. In such an example, the persistent pointers may indicate where corresponding destination variable pointers are located in the destination executable, and the destination variable pointers may indicate where corresponding destination variables are located in a destination memory. Thus, the transfer of delta data may include iterating through the destination pointer index.

Processing may continue from operation 406 to operation 408, "SWITCH FROM THE ORIGIN VIRTUAL MACHINE TO THE DESTINATION VIRTUAL MACHINE", where a switch from the origin virtual machine to the destination virtual machine may be performed. For example, such a switch from the origin virtual machine to the destination virtual machine may be performed when the launching of the destination executable has been completed and the delta queue is empty.

Some additional and/or alternative details related to process 400 may be illustrated in one or more examples of implementations discussed in greater detail below with regard to FIG. 5.

Figure 5:
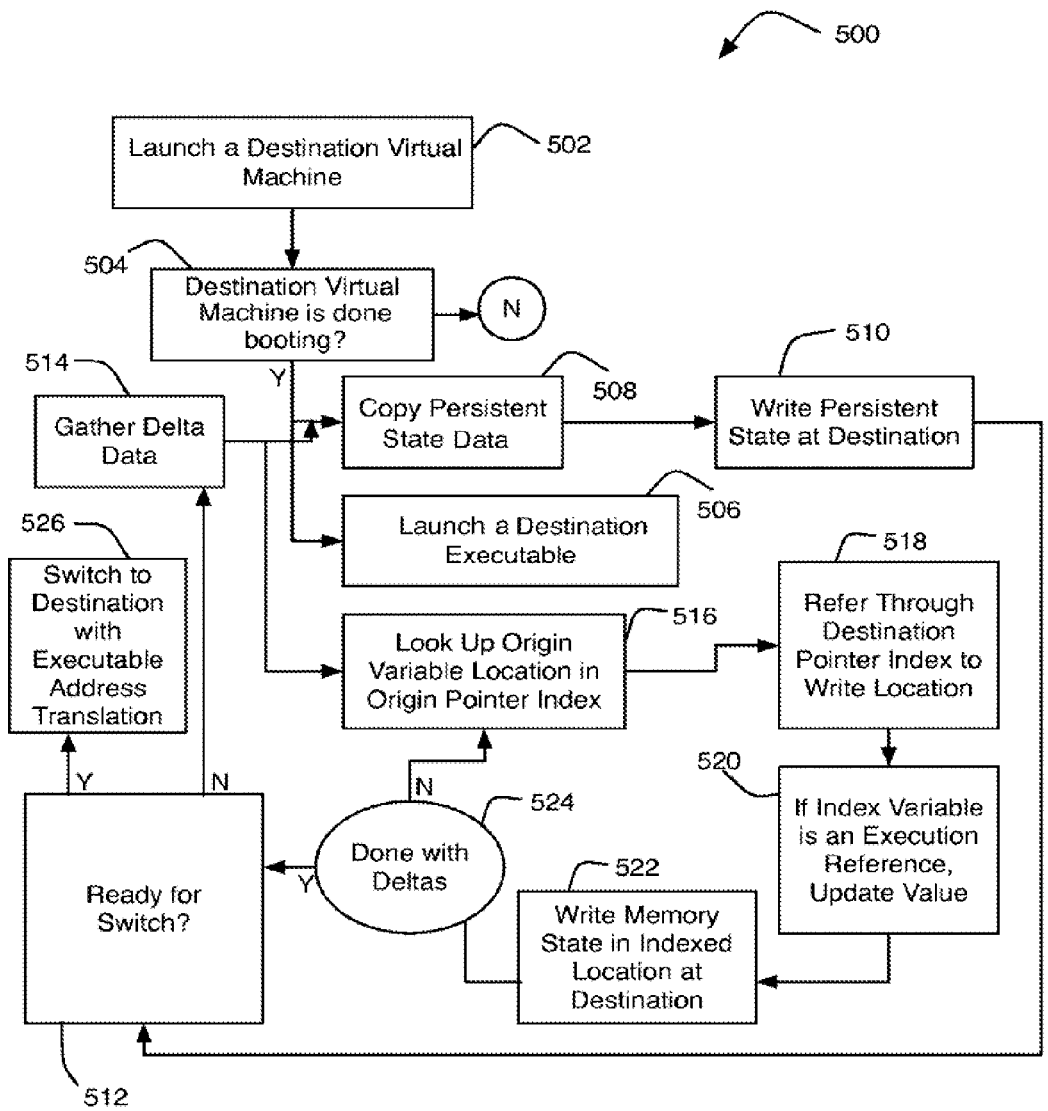
FIG. 5 illustrates another example process for transferring operation from an origin virtual machine to a destination virtual machine that is arranged in accordance with at least some embodiments of the present disclosure.

FIG. 5 illustrates another example process for transferring operation from an origin virtual machine to a destination virtual machine that is arranged in accordance with at least some embodiments of the present disclosure. Process 500 may include one or more of functional operations as indicated by example operations 502, 504, 506, 508, 510, 512, 514, 516, 518, 520, 522, 524, and/or 526.

As illustrated, process 500 may be implemented for transferring operation from an origin virtual machine to a destination virtual machine (see, e.g., FIG. 1). Processing may begin at operation 502, "LAUNCH A DESTINATION VIRTUAL MACHINE" where a destination virtual machine may be launched. For example, a destination virtual machine that has different characteristics than an origin virtual machine may be launched.

Processing may continue from operation 502 to operation 504, "DESTINATION VIRTUAL MACHINE IS DONE BOOTING", where a determination may be made whether the destination virtual machine is done booting. For example, a determination may be made whether the destination virtual machine is done booting. In cases where the destination virtual machine not done booting, operation 504 may be repeated. In cases where the destination virtual machine is done booting, processing may continue from operation 504 to operations 506 and/or 508.

Processing may continue from operation 504 to operation 506, "LAUNCH A DESTINATION EXECUTABLE", where a destination executable on may be launched on a destination virtual machine. For example, a destination executable may be launched on a destination virtual machine, where the destination executable may be appropriate for the destination virtual machine, as opposed to the origin virtual machine (e.g., as may be the case when the destination virtual machine has different characteristics from the origin virtual machine). In some examples, the destination executable may be launched on the destination virtual machine while the origin virtual machine may continue to execute an origin executable. In some examples, the launching of the destination executable on the destination virtual machine may include running the destination executable with an initially empty memory during declaration of variables and during a determination of memory locations associated with the declared variables.

Processing may also continue from operation 504 to operation 508, "COPY PERSISTENT STATE DATA", where persistent state data may be copied. For example, persistent state data may be copied from the origin virtual machine for use by the destination virtual machine. Processing may continue from operation 508 to operation 510, "WRITE PERSISTENT STATE AT DESTINATION", where persistent state data may be written. For example, persistent state data may be written to the destination virtual machine to complete the transfer of persistent state data from the origin virtual machine to the destination virtual machine.

Processing may continue from operation 510 to operation 512, "READY FOR SWITCH", where a determination may be made whether the destination virtual machine is ready for switching operation from the origin virtual machine to the destination virtual machine. For example, such a determination of whether the destination virtual machine is ready for switching operation may be based at least in part on a determination that the launching of the destination executable has been completed, the delta queue is empty, and/or an execution address for the destination executable is associated with one of the multiple bookmark pointers in the destination pointer index. As discussed above, such bookmark pointers in the destination pointer index may be associated with individual points within the destination executable designated as logical points to switch to the destination virtual machine. In cases where the destination virtual machine is ready for switching operation, processing may continue from operation 512 to operation 526. In cases where the destination virtual machine is not ready for switching operation processing may continue from operation 512 to operation 514.

Processing may continue from operation 512 to operation 514, "GATHER DELTA DATA", where past delta data may be gathered from the origin virtual machine. For example, such past delta data may be gathered via block operations or the like from a delta queue associated with the origin virtual machine. In some examples, transferring dynamic state data in bulk may be done prior to transfer of delta data, and then the transfer of delta data may be performed to keep the dynamic state data updated.

Processing may continue from operation 514 to operation 516, "LOOK UP ORIGIN VARIABLE LOCATION IN ORIGIN POINTER INDEX", where an origin variable location may be looked-up in the origin pointer index. For example, locating an origin variable read location (e.g., for translation from origin executable to destination executable) may be located by looking up the gathered past delta data via the origin pointer index. In such an example, the origin pointer index may include multiple persistent pointers associated with corresponding origin variables. In some examples, the origin index pointer may take delta data and utilize a persistent pointer to refer to an address associated with an origin variable pointer (e.g., a pointer in the origin executable), the origin variable pointer may in turn refer to an origin variable in origin memory. For example, the origin pointer index may include multiple persistent pointers associated with corresponding origin variables. In such an example, the persistent pointers may indicate where corresponding origin variable pointers are located in the origin executable, and the origin variable pointers may indicate where corresponding origin variables are located in an origin memory (e.g., the origin variable pointers indicate the origin read location).

Processing may continue from operation 516 to operation 518, "REFER THROUGH DESTINATION POINTER INDEX TO WRITE LOCATION", where a write location associated with a destination variable may be looked-up via the destination pointer index. For example, a destination write location (e.g., for translation from origin executable to destination executable) may be located by referring through the destination pointer index based at least in part on the origin variable read location (see, e.g., Operation 516). In some examples, the destination index pointer may include persistent pointers that may refers an address associated with a destination variable pointer (e.g., a pointer in the destination executable), where the destination variable pointer may in turn refer to an address to write the origin variable into destination memory. For example, the destination pointer index may include multiple persistent pointers associated with corresponding destination variables. In such an example, the persistent pointers may indicate where corresponding destination variable pointers are located in the destination executable, and the destination variable pointers may indicate where corresponding destination variables are located in a destination memory (e.g., the destination variable pointers indicate the destination write location).

Processing may continue from operation 518 to operation 520, "IF INDEX VARIABLE IS AN EXECUTION REFERENCE, UPDATE VALUE", where delta data that is an execution reference may trigger an updated value. For example, such execution references may refer to the line of origin executable currently being processed. When the delta data indicates a change in the execution reference associated with the origin executable, operation 520 will update a corresponding execution reference value associated with the destination executable. In some examples, the destination pointer index may includes multiple bookmark pointers, where the bookmark pointers may be associated with individual points within the destination executable that have been designated as logical points to switch to the destination virtual machine or points that may appear in execution references such as procedure return points, if/then statements, or loops. In such examples, the updated corresponding execution reference value associated with the destination executable may be utilized in operation 512, where a determine is made whether the execution address for the destination executable is associated with one of the multiple bookmark pointers in the destination pointer index.

Additionally or alternatively, updating the execution reference value may occur where the execution reference includes one or more of a procedure location within the destination executable, a return location within the destination executable, a return register from procedures, the like, and/or combinations thereof. In such examples, the execution reference value may be referred to in multiple locations within the destination executable. In such a case, Operation 520 may operate so that all of these locations will be updated throughout the destination executable. Such an update to the locations within the destination executable may be performed because the transferring of operation between origin virtual machine and destination machine may be done mid-process while execution pointers to return points or the like may be needed. For example, the origin pointer index and/or the destination pointer index may contain pointers to individual procedure locations within the associated executable (e.g., the bookmark pointers may be associated with individual points within the destination executable that have been designated as logical points to switch to the destination virtual machine or points that may appear in execution references such as procedure return points, if/then statements, or loops). In such an example, the return locations and return registers from procedures, when translated, may not only be copied but also have their contents updated so that the return is to the equivalent location in the destination executable. In operation, the return locations and return registers from procedures may be updated via an iterative performance of relatively simple indexing operations, for example.

Processing may continue from operation 520 to operation 522, "WRITE MEMORY STATE IN INDEXED LOCATION AT DESTINATION", where writing to destination memory may be performed based at least in part on the destination write location looked-up via the destination pointer index. For example, the write location associated with the destination variable that was previously looked-up via the destination pointer index, at Operation 518, may be utilized to write to destination memory.

Processing may continue from operation 522 to operation 524, "DONE WITH DELTAS", where a determination may be made whether the gathered deltas have been exhausted. In cases where the gathered delta data has not been exhausted processing may continue from operation 524 back to operation 516 in an iterative loop. For example, such an iterative loop may repeat the looking-up the origin variable location in the origin pointer index (see, e.g., Operation 516), determining the destination write location (see, e.g., Operation 518), updating the execution reference value (see, e.g., Operation 520), and/or writing the memory state (see, e.g., Operation 522) until the gathered past deltas have been processed (see, e.g., Operation 524). In cases where the gathered delta data has been exhausted, processing may continue from operation 524 to operation 512. For example, the gathering of past deltas (see, e.g., Operation 514) may be repeated until the destination executable is ready, the delta queue is empty, and the current execution address corresponds to a bookmark pointer in the destination pointer index (see, e.g., Operation 512).

In cases where the destination virtual machine is ready for switching operation, processing may continue from operation 512 to operation 526. Processing may continue from operation 512 to operation 526, "SWITCH TO DESTINATION WITH EXECUTABLE ADDRESS TRANSLATION", where a switch from the origin virtual machine to the destination virtual machine may be performed. For example, such a switch from the origin virtual machine to the destination virtual machine may include utilizing an execution address that has been translated from a position in the origin executable to an associated position in the destination executable. In some examples, such a switch from the origin virtual machine to the destination virtual machine may be performed when the launching of the destination executable has been completed and the delta queue is empty.

In operation, process 500 (and/or process 400 of FIG. 4) may be utilized for moving from a lower capacity origin virtual machine to a higher capacity destination virtual machine. Similarly process 500 (and/or process 400 of FIG. 4) may be utilized for moving from a higher capacity destination virtual machine to a lower capacity origin virtual machine. For example, moving to a virtual machine with less capability (e.g., as might be done after a demand peak is over, for example) may be done in the same or similar manner as the moving to a virtual machine with greater capability. In such an example, operations may be added to process 500 (and/or process 400 of FIG. 4) that may be directed to having the application clear unneeded memory (e.g., garbage collection).

In operation, process 500 (and/or process 400 of FIG. 4) may allow the use of smaller cloud virtual machines when they will do the job, and larger ones only as needed, with reduced or eliminated down time. Such a capability has been calculated as likely to save many users as much as ninety percent or more under current pricing models and may also provide additional efficiencies and market share for microservers during slower times, allowing future data centers to support more customers with less power and heat. For example, many users may find that the impact of having to stop and move a process during what would, by definition, be their busiest moments, is unacceptable and so they may have to purchase "Large" or even "Extra Large" virtual machines to protect against the few times when it is needed. In cases where "large" virtual machine are priced at four times the price of a "small" virtual machine and an "extra large" virtual machine is priced at eight times the price of a "small" virtual machine, such users might have their costs decrease almost 4-8× if they could simply run on a small virtual machine most of the time and seamlessly move to larger virtual machines without stopping.

Additionally or alternatively, process 500 (and/or process 400) may be performed in a just-in-time environment. In such an example, the origin virtual machine and the destination virtual machine may be run in parallel with duplicate inputs. Output from the origin virtual machine and the destination virtual machine may be compared based at least in part on the duplicate inputs prior to switching from the origin virtual machine to the destination virtual machine. Such compilation systems may iterate through operation of dynamically compiled code, tracking the heavy demand procedure calls, and then focusing on those heavy demand procedure calls. Such just-in-time-type compilation systems may receive uniform partially compiled binaries or "thin binaries" and then may have local optimizations that may be adjusted to be as specific as desired to the device that the program is running on. In cases where process 500 (and/or process 400) are performed in a just-in-time environment, operations associated with origin pointer index module 112 and/or destination pointer index module 114 may be implemented instead at the JIT compiler level, while other operations may be performed in the same and/or similar manner to that described in processes 400 and/or 500. In cases where the code is subject to continuous optimization, such optimization may be turned off for both the origin virtual machine and the destination virtual machine for the duration of the migration.

Additionally or alternatively, process 500 (and/or process 400) may be performed in an arbitrary binary-type environment. A variety of methods may be utilized for attempting to map out an already compiled binary including building call trees and branching maps, for example. For example, local topology may be matched within such a call tree to build an identity for each variable and execution reference so that pointer indexes for the origin virtual machine and the destination virtual machine can match origin variables to destination variables.

Additionally or alternatively, process 500 (and/or process 400) may generate special cloud versions of the software in cases where memory management is needed. For example, when exact memory management (e.g. management dependent on mapping certain objects to particular addresses) is in use (e.g. for software license locks), such special cloud versions of the software may be generated that do not require such special memory management but instead may rely on communication directly with a virtual machine hypervisor.

FIG. 6 illustrates an example computer program product 600 that is arranged in accordance with at least some examples of the present disclosure. Program product 600 may include a signal bearing medium 602. Signal bearing medium 602 may include one or more machine-readable instructions 604, which, if executed by one or more processors, may operatively enable a computing device to provide the functionality described above with respect to FIG. 4 and/or FIG. 5. Thus, for example, referring to the system of FIG. 1, cloud computing system 100 may undertake one or more of the actions shown in FIG. 4 and/or FIG. 5 in response to instructions 604 conveyed by medium 602.

In some implementations, signal bearing medium 602 may encompass a non-transitory computer-readable medium 606, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass communications medium 610, such as, but not limited to, a digital and/or an analog communication medium (e.g., a fiber optic cable, a waveguide, a wired communications link, a wireless communication link, etc.).

Figure 7:
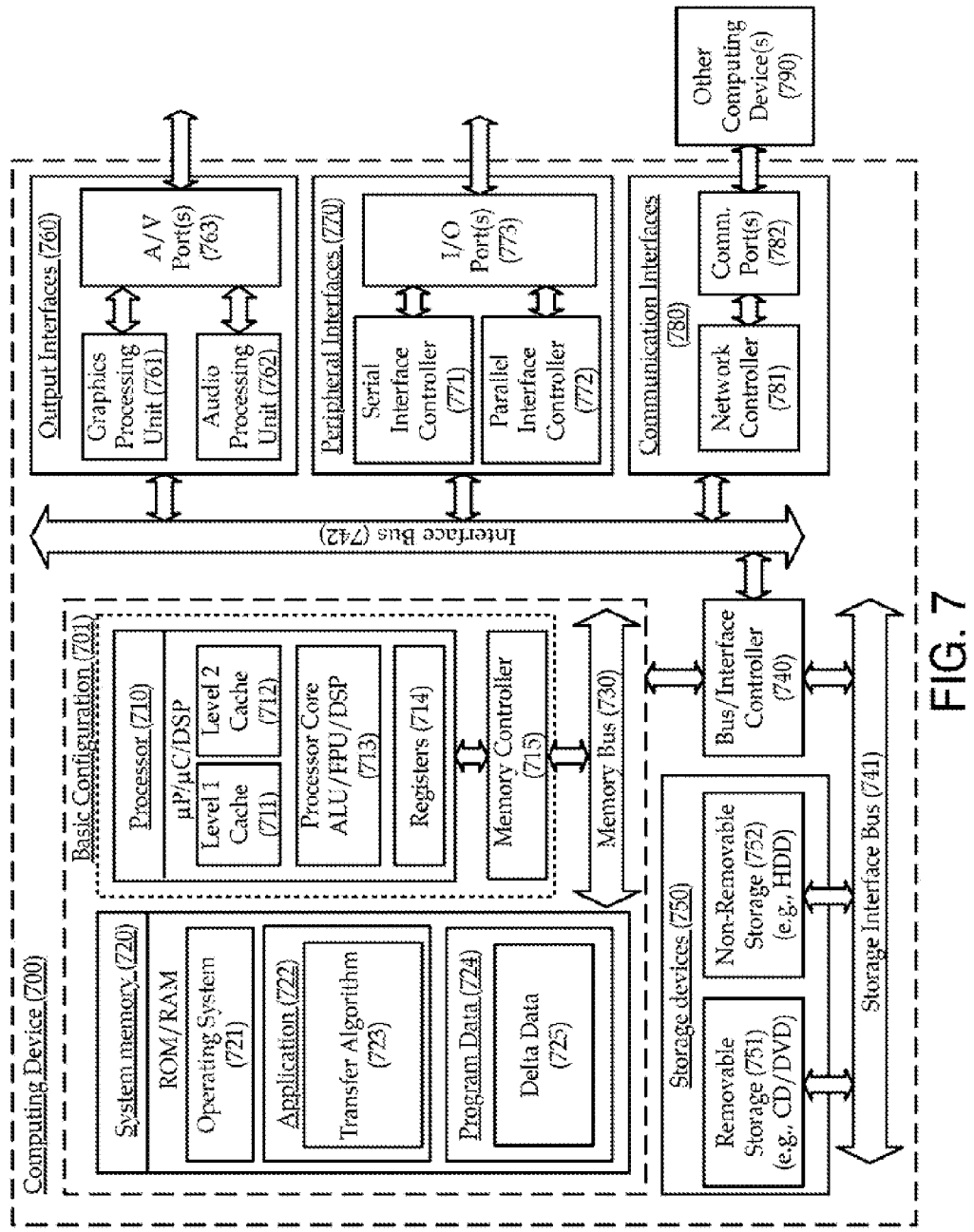
FIG. 7 is a block diagram of an illustrative embodiment of a computing device arranged in accordance with at least some embodiments of the present disclosure.

FIG. 7 is a block diagram illustrating an example computing device 700, such as might be embodied by a person skilled in the art, which is arranged in accordance with at least some embodiments of the present disclosure. In one example configuration 701, computing device 700 may include one or more processors 710 and system memory 720. A memory bus 730 may be used for communicating between the processor 710 and the system memory 720.

Depending on the desired configuration, processor 710 may be of any type including but not limited to a microprocessor (µP), a microcontroller (µC), a digital signal processor (DSP), or any combination thereof. Processor 710 may include one or more levels of caching, such as a level one cache 711 and a level two cache 712, a processor core 713, and registers 714. The processor core 713 may include an arithmetic logic unit (ALU), a floating point unit (FPU), a digital signal processing core (DSP Core), or any combination thereof. A memory controller 715 may also be used with the processor 710, or in some implementations the memory controller 715 may be an internal part of the processor 710.

Depending on the desired configuration, the system memory 720 may be of any type including but not limited to volatile memory (such as RAM), non-volatile memory (such as ROM, flash memory, etc.) or any combination thereof. System memory 720 may include an operating system 721, one or more applications 722, and program data 724. Application 722 may include a transfer algorithm 723 that is arranged to perform the functions as described herein including the functional blocks and/or actions described with respect to process 400 of FIG. 4 and/or process 500 of FIG. 5. Program Data 724 may include delta data 725 for use with transfer algorithm 723. In some example embodiments, application 722 may be arranged to operate with program data 724 on an operating system 721 such that implementations of transferring operation from an origin virtual machine to a destination virtual machine while the origin virtual machine continues to execute an origin executable may be provided as described herein. For example, cloud computing system 100 (see, e.g., FIG. 1) may comprise all or a portion of computing device 700 and be capable of performing all or a portion of application 722 such that implementations of transferring operation from an origin virtual machine to a destination virtual machine while the origin virtual machine continues to execute an origin executable may be provided as described herein. This described basic configuration is illustrated in FIG. 7 by those components within dashed line 701.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of device 700.

Computing device 700 may also include an interface bus 742 for facilitating communication from various interface devices (e.g., output interfaces, peripheral interfaces, and communication interfaces) to the basic configuration 701 via the bus/interface controller 740. Example output interfaces 760 may include a graphics processing unit 761 and an audio processing unit 762, which may be configured to communicate to various external devices such as a display or speakers via one or more A/V ports 763. Example peripheral interfaces 770 may include a serial interface controller 771 or a parallel interface controller 772, which may be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which may be arranged to facilitate communications with one or more other computing devices 790 over a network communication via one or more communication ports 782. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 700 may also be implemented as a personal computer including both laptop computer and non-laptop computer configurations. In addition, computing device 700 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A computer implemented method to transfer operation from an origin virtual machine to a destination virtual machine, comprising:
   identifying, from uncompiled code, delta data comprising uses of dynamic memory on the origin virtual machine including at least one of variable declarations, procedure calls and procedure returns;
   launching a destination executable on a destination virtual machine while the origin virtual machine continues to execute an origin executable, wherein the destination virtual machine has different characteristics from the origin virtual machine;
   transferring persistent state data from the origin virtual machine to the destination virtual machine;
   transferring delta data from a delta queue associated with the origin virtual machine to the destination virtual machine while the origin virtual machine continues to execute the origin executable; and switching operation from the origin virtual machine to the destination virtual machine when the launching of the destination executable has been completed and the delta queue is empty, wherein transferring the delta data further comprises:
gathering past delta data from the delta queue associated with the origin virtual machine;
locating an origin variable read location by looking up the gathered past delta data via an origin pointer index;
determining a destination write location by referring through a destination pointer index based at least in part on the located origin variable read location; and
writing a memory state in destination memory based at least in part on the destination write location.

2. The method of claim 1, wherein the launching of the destination executable on the destination virtual machine comprises running the destination executable with an initially empty memory to declare variables and determine memory locations associated with the declared variables.

3. The method of claim 1, wherein transferring the delta data further comprises transferring the delta data from the origin virtual machine to the destination virtual machine based at least in part on an origin pointer index, wherein the origin pointer index comprises a plurality of persistent pointers associated with corresponding origin variables, wherein the plurality of persistent pointers indicate where corresponding origin variable pointers are located in the origin executable, wherein the origin variable pointers indicate where corresponding origin variables are located in an origin memory.

4. The method of claim 1, wherein transferring the delta data further comprises transferring the delta data from the origin virtual machine to the destination virtual machine based at least in part on a destination pointer index, wherein the destination pointer index comprises a plurality of persistent pointers associated with corresponding destination variables, wherein the plurality of persistent pointers indicate where corresponding destination variable pointers are located in the destination executable, wherein the destination variable pointers indicate where corresponding destination variables are located in a destination memory.

5. The method of claim 1, wherein transferring the delta data further comprises:
gathering past delta data from the delta queue associated with the origin virtual machine;
locating an origin variable read location by looking up the gathered past delta data via an origin pointer index, wherein the origin pointer index comprises a plurality of persistent pointers associated with corresponding origin variables, wherein the plurality of persistent pointers indicate where corresponding origin variable pointers are located in the origin executable, wherein the origin variable pointers indicate where corresponding origin variables are located in an origin memory;
determining a destination write location by referring through a destination pointer index based at least in part on the origin variable read location, wherein the destination pointer index comprises a plurality of persistent pointers associated with corresponding destination variables, wherein the plurality of persistent pointers indicate where corresponding destination variable pointers are located in the destination executable, wherein the destination variable pointers indicate the destination write location where corresponding destination variables are located in a destination memory; and
writing a memory state in destination memory based at least in part on the destination write location.

6. The method of claim 1, wherein switching operation from the origin virtual machine to the destination virtual machine comprises switching operation from the origin virtual machine to the destination virtual machine when the launching of the destination executable has been completed, the delta queue is empty, and an execution address for the destination executable is associated with one of a plurality of bookmark pointers in the destination pointer index; and
wherein the plurality of bookmark pointers in the destination pointer index are associated with individual points within the destination executable designated as logical points to switch to the destination virtual machine.

7. The method of claim 1, wherein transferring the delta data further comprises:
transferring the delta data from the origin virtual machine to the destination virtual machine based at least in part on an origin pointer index and a destination pointer index,
wherein the origin pointer index comprises a plurality of persistent pointers associated with corresponding origin variables, wherein the plurality of persistent pointers indicate where corresponding origin variable pointers are located in the origin executable, wherein the origin variable pointers indicate where corresponding origin variables are located in an origin memory,
wherein the destination pointer index comprises a plurality of persistent pointers associated with corresponding destination variables, wherein the plurality of persistent pointers indicate where corresponding destination variable pointers are located in the destination executable, wherein the destination variable pointers indicate where corresponding destination variables are located in a destination memory, and
wherein the destination pointer index comprises a plurality of bookmark pointers, wherein the plurality of bookmark pointers are associated with individual points within the destination executable designated as logical points to switch to the destination virtual machine.

8. The method of claim 1, wherein transferring the delta data further comprises updating an execution reference value when the delta data is associated with an execution reference, wherein the execution reference comprises one or more of a procedure location within the destination executable, a return location within the destination executable, and/or a return register from procedures.

9. The method of claim 1, further comprising:
running the origin virtual machine and the destination virtual machine in parallel with duplicate inputs, wherein the destination virtual machine comprises a just-in-time-type compiler; and
comparing output from the origin virtual machine and the destination virtual machine based at least in part on the duplicate inputs prior to switching operation from the origin virtual machine to the destination virtual machine.

10. The method of claim 1, wherein different characteristics comprise one or more of a memory capacity-type characteristic, a processing capacity-type characteristic, an address-type characteristic, an operating system-type characteristic, and/or an application programming interface-type characteristic.

11. A computing device, comprising:
a processor;
a non-transitory computer readable medium comprising logic instructions which, when executed by the processor, configure the processor to:

identify, from uncompiled code, delta data comprising uses of dynamic memory on an origin virtual machine including at least one of variable declarations, procedure calls and procedure returns;

generate an origin pointer index associated with an origin executable, wherein the origin executable is configured to be executed on the origin virtual machine;

generate a destination pointer index associated with a destination executable, wherein the destination executable is configured to be executed on a destination virtual machine, wherein the destination virtual machine has different characteristics from the origin virtual machine;

transfer persistent state data from the origin virtual machine to the destination virtual machine; and transfer delta data from a delta queue associated with the origin virtual machine to the destination virtual machine while the origin virtual machine continues to execute the origin executable based at least in part on the origin pointer index and the destination pointer index, wherein the transfer of the delta data further comprises:

gather past delta data from the delta queue associated with the origin virtual machine;

locate an origin variable read location by looking up the gathered past delta data in the origin pointer index;

determine a destination write location by referring through the destination pointer index based at least in art on the origin variable read location; and write a memory state in destination memory based at least in part on the destination write location.

12. The computing device of claim 11, wherein the origin pointer index comprises a plurality of persistent pointers associated with corresponding origin variables, wherein the plurality of persistent pointers indicate where corresponding origin variable pointers are located in the origin executable, wherein the origin variable pointers indicate where corresponding origin variables are located in an origin memory.

13. The computing device of claim 11, wherein the destination pointer index comprises a plurality of persistent pointers associated with corresponding destination variables, wherein the plurality of persistent pointers indicate where corresponding destination variable pointers are located in the destination executable, wherein the destination variable pointers indicate where corresponding destination variables are located in a destination memory.

14. The computing device of claim 11, wherein the transfer of the delta data via the fourth module further comprises the fourth module being configured to:

gather past delta data from the delta queue associated with the origin virtual machine;

locate an origin variable read location by looking up the gathered past delta data in the origin pointer index, wherein the origin pointer index comprises a plurality of persistent pointers associated with corresponding origin variables, wherein the plurality of persistent pointers indicate where corresponding origin variable pointers are located in the origin executable, wherein the origin variable pointers indicate where corresponding origin variables are located in an origin memory;

determine a destination write location by referring through the destination pointer index based at least in part on the origin variable read location, wherein the destination pointer index comprises a plurality of persistent pointers associated with corresponding destination variables, wherein the plurality of persistent pointers indicate where corresponding destination variable pointers are located in the destination executable, wherein the destination variable pointers indicate the destination write location where corresponding destination variables are located in a destination memory; and write a memory state in destination memory based at least in part on the destination write location.

15. The computing device of claim 11, wherein the transfer of the delta data via the fourth module further comprises the fourth module being configured to transfer the delta data from the origin virtual machine to the destination virtual machine based at least in part on a destination pointer index, wherein the destination pointer index comprises a plurality of bookmark pointers, wherein the plurality of bookmark pointers are associated with individual points within the destination executable designated as logical points to switch to the destination virtual machine.

16. The computing device of claim 11, wherein the origin pointer index comprises a plurality of persistent pointers associated with corresponding origin variables, wherein the plurality of persistent pointers indicate where corresponding origin variable pointers are located in the origin executable, wherein the origin variable pointers indicate where corresponding origin variables are located in an origin memory, wherein the destination pointer index comprises a plurality of persistent pointers associated with corresponding destination variables, wherein the plurality of persistent pointers indicate where corresponding destination variable pointers are located in the destination executable, wherein the destination variable pointers indicate where corresponding destination variables are located in a destination memory, and wherein the destination pointer index comprises a plurality of bookmark pointers, wherein the plurality of bookmark pointers are associated with individual points within the destination executable designated as logical points to switch to the destination virtual machine.

17. The computing device of claim 11, wherein different characteristics comprise one or more of a memory capacity-type characteristic, a processing capacity-type characteristic, an address-type characteristic, an operating system-type characteristic, and/or an application programming interface-type characteristic.

18. An article comprising:

a non-transitory computer readable medium comprising machine-readable instructions stored thereon, which, if executed by one or more processors, operatively enable a computing device to:

identify, from uncompiled code, delta data comprising uses of dynamic memory on an origin virtual machine including at least one of variable declarations, procedure calls and procedure returns;

launch a destination executable on a destination virtual machine while the origin virtual machine continues to execute an origin executable, wherein the destination virtual machine has different characteristics from the origin virtual machine;

transfer persistent state data from the origin virtual machine to the destination virtual machine;

transfer delta data from a delta queue associated with the origin virtual machine to the destination virtual machine while the origin virtual machine continues to execute the origin executable; and switch from the origin virtual machine to the destination virtual machine when the launching of the destination executable has been completed and the delta queue is empty, wherein transferring the delta data further comprises:

gathering past delta data from the delta queue associated with the origin virtual machine;

locating an origin variable read location by looking up the gathered past delta data via an origin pointer index; and determining a destination write location by referring through a destination pointer index based at least in part on the located origin variable read location; and writing a memory state in destination memory based at least in part on the destination write location.

19. The article of claim 18, wherein the launch of the destination executable on the destination virtual machine comprises running the destination executable with an initially empty memory to declare variables and determine memory locations associated with the declared variables.

* * * * *

UNITED STATES PATENT AND TRADEMARK OFFICE
CERTIFICATE OF CORRECTION

PATENT NO.       : 9,189,271 B2
APPLICATION NO.  : 13/497529
DATED            : November 17, 2015
INVENTOR(S)      : Kruglick Page 1 of 1

It is certified that error appears in the above-identified patent and that said Letters Patent is hereby corrected as shown below:

Title Page, in item (73), under "Assignee", in Column 1, Line 1, delete "Development." and insert -- Development --, therefor.

In the Specification

In Column 1, Line 11, delete "§371" and insert -- § 371 --, therefor.

In the Claims

In Column 25, Line 29, in Claim 11, delete "art" and insert -- part --, therefor.

Signed and Sealed this
Second Day of August, 2016

Michelle K. Lee
*Director of the United States Patent and Trademark Office*